No. 642,932. Patented Feb. 6, 1900.
C. W. & J. B. SQUIRES.
ELECTRIC CURRENT CONTROLLING MECHANISM.
(Application filed Mar. 15, 1899.)
(No Model.) 2 Sheets—Sheet 1.
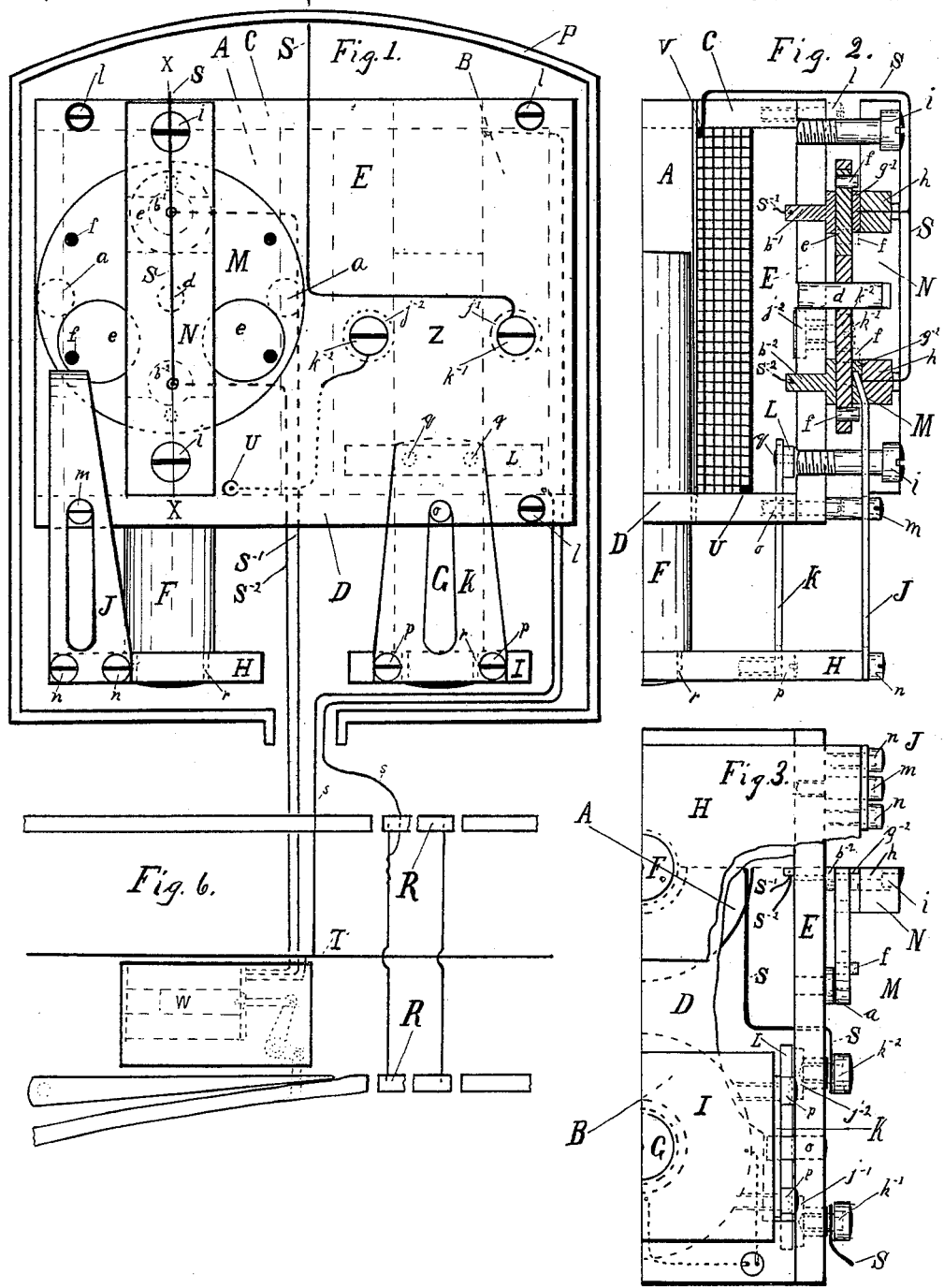
Witnesses
John C. Wilson
Inventors
Charles Wm Squires
James B Squires

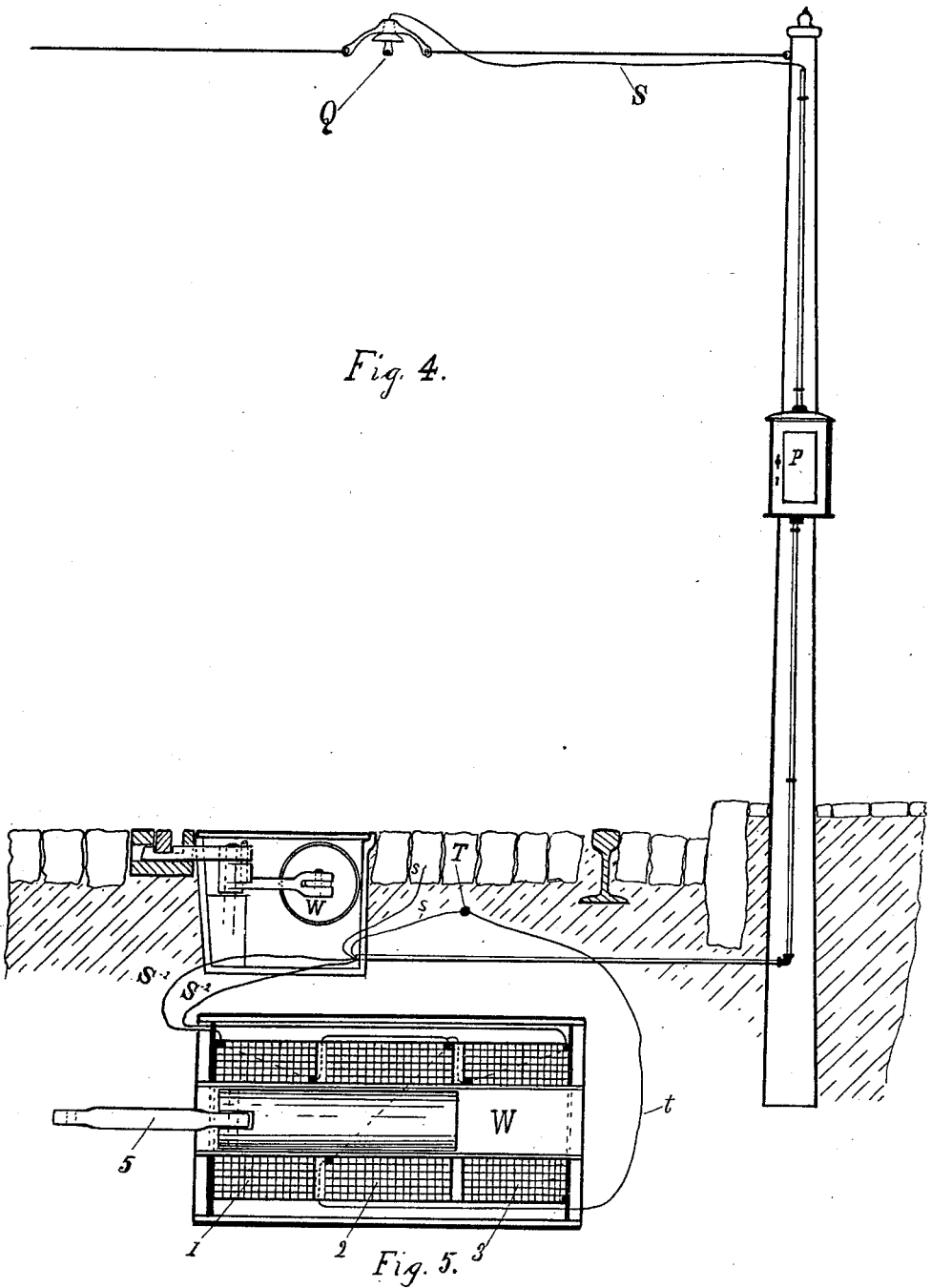

UNITED STATES PATENT OFFICE.

CHARLES WM. SQUIRES AND JAMES B. SQUIRES, OF SPRINGFIELD, MASSACHUSETTS.

ELECTRIC-CURRENT-CONTROLLING MECHANISM.

SPECIFICATION forming part of Letters Patent No. 642,932, dated February 6, 1900.

Application filed March 15, 1899. Serial No. 709,207. (No model.)

*To all whom it may concern:*

Be it known that we, CHARLES WILLIAM SQUIRES and JAMES B. SQUIRES, citizens of the United States, residing at Springfield, in the county of Hampden and State of Massachusetts, have invented a new and useful Device Pertaining to Electric Switch-Throwing Mechanisms for Electric Railways, of which the following is a specification.

Our invention relates to a device for automatically controlling the circuits comprising the magnets of car-switch-throwing mechanisms in which all or some of the movable parts are operated by magnets; and the object of our invention is to provide a means of controlling the action of said magnets that the operation of the switch-throwing mechanism with which they are connected may be made practical and reliable. We attain this object by the use of a mechanism and appurtenances illustrated in the accompanying drawings, in which—

Figure 1 is a vertical face view of a circuit or current controlling device, which we will hereinafter refer to as a "current-controller." Fig. 2 is a vertical sectional view of Fig. 1 on lines X X, with rear half cut away to the center of magnets. Fig. 3 is a bottom view of Fig. 2 with small sections of plates H and D cut away. Fig. 4 is a section view of a car-track, switch-bed, switch-throwing mechanism, trolley or feed wire, and supporting-pole with box attached thereto in which is located a current-controlling device. This view also shows circuit-conductor leading from trolley-wire to the controller-box. Fig. 5 is a detail sectional view of a double-acting solenoid magnet with circuit-conductors attached. Fig. 6 is a plan view of a section of track with switch, switch-throwing device, insulated section of rail, and circuit-conductors. Fig. 6, in connection with Fig. 1, shows plan of circuit-conductors connecting with insulated rail-section controller and switch-throwing magnet, Figs. 1 and 4 showing principal feed-wire leading from trolley-wire to the circuit making and breaking switch in the controller-box.

Similar characters refer to similar parts throughout the several views.

The magnets A and B, with their end plates C and D, support the switchboard E, which is held in position by switchboard-screws $l\ l\ l$ and $m$, the whole being supported in a box P, suitable for the purpose. Magnets A and B are fitted with armatures F and G, respectively, armature F carrying armature-plate H, which supports a spring-ratchet J, which is fastened to said plate H by screws $n\ n$. Switchboard-screw $m$ protrudes through an aperture in spring-ratchet J, thereby limiting the fall of armature F. Armature G carries armature-plate I, which supports spring K, which in turn carries switching-bar L, to which it is attached with rivets $q\ q$, spring K being held fast to plate I by screws $p\ p$. Stud $o$ protrudes through aperture in spring K, thereby limiting the fall of armature G. Armature-plates H and I are held fast to their respective armatures by threads $r\ r$.

Switchboard E is fitted on the left side with studs $a\ a$, $b'$, and $b^2$, which support circuit-changing disk M, which is held in its central position by pivot-stud $d$, which is in turn held firmly by switchboard E. Studs $b'$ and $b^2$ act also as contact-studs and are comprised in circuit-conductors S' and S², respectively. Circuit-changing disk M is held firmly against its supports by friction-contacts $g'$ and $g^2$, which connect with and are comprised in circuit-conductor S. Said friction-contacts are held in position in recesses in insulator-block N and are backed by rubber cushions $h\ h$, insulator-block N being itself held in proper place by screws $i\ i$ and pivot-stud $d$. Circuit-changing disk M carries three transfer-plates $e\ e\ e$, which serve to transfer the electric current between the contacts $b'$ and $g'$ or $b^2$ and $g^2$, as the case may be. Circuit-changing disk M also carries six ratchet-studs $f\ f\ f\ f\ f\ f$, by means of which and the spring-ratchet J the position of said disk M is changed at each action of the magnet by passage of an electric current through its coils. As the position of the circuit-changing disk is shifted the flow of electricity from conductor S through the transfer-plates to conductors S' or S² is diverted from the one to the other. Circuits S' and S² are the ones leading to magnet or magnets in the car-switch-throwing mechanism.

The right-hand section of switchboard E supports contact-studs $j'$ and $j^2$, which in turn are fitted with binding-screws $k'$ and $k^2$. The contact-studs $j'j^2$ and the switching-bar L cooperate and constitute the circuit making and breaking switch Z, Fig. 1.

In Fig. 4 the circuit-conductor S, leading from feed-wire Q to the controller-box P and comprising the circuit making and breaking switch Z, Fig. 1, is the principal circuit. $S'$ and $S^2$, Fig. 4, are branches of principal circuit S.

In Fig. 6 the circuit-conductor $s$, connecting the insulated track-rails R R and the return-wire T and comprising the coils of magnet B, Fig. 1, is the secondary circuit.

In Figs. 5 and 6 the two branches $S'$ and $S^2$ of the principal circuit S are shown entering magnet W, branch $S'$ comprising the coils of sections 1 and 2, while branch $S^2$ comprises the coils of sections 3 and 2, both branches then uniting and passing out of the magnet as wire $t$ and connecting with return-wire T.

Having described the different parts and adjuncts of the mechanism, we will explain its operation as follows: Magnet B, being comprised in circuit-conductors connecting the insulated section of track R R to the return or ground wire T, Fig. 6, is energized upon passage of an electric current from a car on said insulated section of track, thereby attracting its armature G, which on rising operates, by means of switch-bar L and contacts $j'$ and $j^2$, to close circuit S. A current now flows through circuit S from the trolley or feed wire Q, Fig. 4, and upon passing through the coils of magnet A, which is comprised in its circuit, causes armature F to act and by means of the ratchet J and studs $f$ shift the circuit-changing disk, thereby diverting the current from one of the circuits $S'$ or $S^2$ to the other. The current continuing along its circuit reaches and passes through the magnet in the car-switch-throwing mechanism and enters the ground or return wire T, Figs. 4 and 6. There is an instant as the circuit-changing disk is shifted when the electric current reaches both branches $S'$ and $S^2$. As one transfer-plate disconnects another connects with contacts comprised in the circuits $S'$, $S^2$, and S.

It will be clearly seen on referring to Fig. 5 that both circuits $S'$ and $S^2$ pass through two sections of the magnet. An electric current passing through circuit $S'$ traverses the coils of sections 1 and 2 of magnet W, Fig. 5, thereby making those sections act as a complete magnet and attracting the armature or piston to the position occupied in Fig. 5. An electric current traversing circuit $S^2$ will pass through sections 3 and 2, Fig. 5, thereby energizing those sections and attracting the piston to a position central with those sections and opposite to the one shown in Fig. 5. It may be well to note here that the magnet piston or armature must be insulated magnetically.

It will be noticed that both of branch circuits $S'$ and $S^2$ comprise two sections of the magnet and that section 2 is comprised in both circuits $S'$ and $S^2$.

It will be seen that the magnet described above is a compound magnet. A magnet having only two separate sections would operate the same when properly connected; but it is evident that the magnet here described has its advantages in being more compact and permitting a saving of nearly one-third in magnet material, as the center section is made to help propel the piston in either direction.

In case the current-controlling device is used to operate a simple magnet the circuit-changing part would be "cut out" and circuit S would connect from binding-screw $k^2$, Fig. 3, direct to the car-switch-operating magnet. Were a simple magnet used to throw the switch, the reverse movement would be attained mechanically.

It is not our desire to limit ourselves to the particular plan of circuit-conductors shown in the drawings of the controller. It will be readily seen that the weaker or secondary current from a car on the insulated section of track may be made to operate either or both of the circuit-changing and the circuit-making magnets, that different parts of the mechanism may be cut out, or that one current alone (the one from the insulated section of track) may be used both to operate the circuit-changing switch and the car-switch-operating magnet, in which case the circuit-making switch in the controller device would not be used.

As the current from the insulated rail is more or less uncertain, we believe it is essential to use a current direct from the feed-wire to insure the best results in operating the switch-throwing magnets, and we rely on the circuit-making magnet in the controller to act on the passage of a certain strength of current from the car through its coils.

Having thus described our invention, what we claim, and desire to secure by Letters Patent, in a current-controlling mechanism for electrically-operated car-switch-throwing mechanisms, is—

1. In combination, a magnet and its armature, a circuit-changing switch, comprising a circuit-changing disk and contacts with which said disk coöperates, operated by said magnet and its armature, and circuit-conductors comprising said contacts and coils of said magnet and suitable feed and return wires, as described.

2. In combination, a magnet and its armature, an electric-circuit switch operated by said armature, circuit-conductors comprising an insulated section of car-track, the coils of said magnet and a ground or return wire, a circuit-changing switch, a circuit-conductor connecting said circuit-changing switch with feed-wire and comprising the first-named electric-circuit switch, two other circuit-conductors leading from and comprising said circuit-changing switch to ground-wire and also comprising coils in a car-switch-operating magnet, substantially as set forth.

3. In combination, a magnet and its armature, an electric-circuit making and breaking switch operated by said armature, an electric conductor comprising the coils of said magnet, a circuit-changing switch comprising an electric-circuit-changing disk of insulating material, metallic transfer-plates, set therein, and contacts with which said transfer-plates coöperate, circuit-conductors comprising said electric-circuit making and breaking switch, said electric-circuit-changing switch with feed and return wires, as set forth.

4. In combination, a magnet and its armature, an electric-circuit switch operated by said armature, circuit-conductors comprising an insulated section of track, the coils of said magnet, and the ground or return wire, a second and distinct circuit leading from trolley or feed wire and comprising the electric-circuit switch above mentioned, the coils of a car-switch-operating magnet, and a ground or return wire, substantially as described.

5. An electrically-operated, circuit-making switch, a magnet and its armature for operating the same, a circuit-conductor connecting an insulated section of car-track with the return-wire and comprising in its circuit the coils of the magnet above mentioned, another circuit-conductor separate and distinct from the first, said second conductor leading from a feed-wire to a return-wire and comprising in its circuit the aforesaid electrically-operated circuit-making switch, and the coils of a car-switch-operating magnet, substantially as described.

6. The combination of a current-controlling device, a box for supporting and protecting the same, circuit-conductors connecting insulated section of car-track with a return-wire, and comprising in its circuit the operating mechanism of said current-controlling device, a second and distinct circuit leading from feed-wire through and controlled by said current-controlling device, and a post for supporting said current-controlling device, substantially as described.

CHARLES WM. SQUIRES.
JAMES B. SQUIRES.

Witnesses:
F. E. CARPENTER,
JOHN C. WILSON.